US005509319A

United States Patent [19]

Hitzman

[11] Patent Number: 5,509,319

[45] Date of Patent: Apr. 23, 1996

[54] ADAPTER FOR PIPETTER AND HYPODERMIC NEEDLE

[75] Inventor: Donald O. Hitzman, Bartlesville, Okla.

[73] Assignee: Geo-Microbial Technologies, Inc., Ochelata, Okla.

[21] Appl. No.: 267,016

[22] Filed: Jun. 21, 1994

[51] Int. Cl.[6] .................... G01N 1/14

[52] U.S. Cl. .................... 73/864.14; 73/864.01

[58] Field of Search .................... 73/864.01, 864.14, 73/864.16, 864.18

[56] References Cited

U.S. PATENT DOCUMENTS

| | | | |
|---|---|---|---|
| 2,959,964 | 11/1960 | Streitfeld . | |
| 4,014,797 | 3/1977 | Raines et al. | 210/446 |
| 4,341,212 | 7/1982 | Medwid | 604/148 |
| 4,730,488 | 3/1988 | Mago et al. | 73/23.35 |
| 4,752,291 | 6/1988 | Magrath | 604/240 |
| 4,933,148 | 6/1990 | Perlman | 422/100 |
| 4,961,350 | 10/1990 | Tennstedt | 73/864.01 |
| 4,965,050 | 10/1990 | Jessop | 422/100 |
| 4,999,164 | 3/1991 | Puchinger et al. | 422/100 |
| 5,205,833 | 4/1993 | Harsh et al. | 604/240 |
| 5,382,241 | 1/1995 | Choudhury et al. | 604/192 |

*Primary Examiner*—Thomas P. Noland
*Attorney, Agent, or Firm*—Foley & Lardner

[57] ABSTRACT

A pipetter is connected to a hypodermic needle by an adapter. The adapter includes a conduit with male and female ends and a predetermined volume. The female end of the conduit is dimensioned to receive the end of the pipetter to form a substantially air-tight friction fit. The male end of a conduct is dimensioned to be inserted into the needle holder to form a substantially air-tight friction fit. The volume of the conduit is greater than a volume of the fluid to be transferred. The adapter allows one to combine the advantages of a hypodermic needle with the superior volumetric measuring capabilities of a pipetter, while eliminating the waste associated with disposable syringes.

11 Claims, 1 Drawing Sheet

ADAPTER FOR PIPETTER AND HYPODERMIC NEEDLE

BACKGROUND OF THE INVENTION

The present invention relates to an apparatus and method for transferring a volume of fluid and, in particular, to an adapter for connecting a pipetter to a hypodermic needle.

It is known to use a pipetter to transfer precise volumes of fluid from one object to another object. The pipetter is fitted with a plastic disposable pipetter tip for containing the volume of fluid to be transferred. The pipetter tip prevents the pipetter from becoming contaminated with the fluid to be transferred. However, pipetter tips are relatively large in size compared to hypodermic needles and do not have the sharp ends or structural strength of hypodermic needles. Therefore, the known arrangement of a pipetter with a pipetter tip is not suitable for transferring fluids when only a very small opening is available for insertion of the pipetter tip or when a surface must be pierced in order to transfer the fluid.

When the features of a hypodermic needle are required, that is, when only a very small opening is available for insertion or a surface must be pierced in order to transfer the fluid, the known solution is to use a hypodermic needle attached to a syringe. The hypodermic needle typically includes a holder which is secured to the end of a syringe. One problem with the use of syringes and hypodermic needles is that volumes cannot be measured as accurately with a syringe as with a pipetter. For example, with a syringe, the volume is measured by visually aligning the meniscus of the fluid in the syringe tube with the desired volumetric mark placed on the tube. On the other hand, pipetters have, for example, a rotary threaded adjustment wherein the volume is digitally shown as a function of the movement of the rotary knob.

Another problem with the syringe and needle apparatus is that the fluid to be transferred actually enters the body of the syringe. Therefore, after each use, the syringe must either be sterilized or thrown away. Even though disposable plastic syringes are available, their cost becomes very great when performing hundreds of transferring operations daily, as in a modern research laboratory.

Another problem with syringes and needles is that the needles are typically threaded on and off the syringe. The threading operation creates a risk of the needle piercing the hand of the user. The risk is especially great if the needle is contaminated with a toxic substance or life form.

SUMMARY OF THE INVENTION

It is an object of the present invention to provide an improved apparatus and method for transferring fluids.

It is another object of the invention to provide an adapter for connecting a pipetter to a hypodermic needle.

It is still another object of the invention to provide an apparatus and method for transferring fluids which is less expensive than prior art apparatus and methods.

It is yet another object of the invention to provide an apparatus and method for transferring fluids which combines the advantages of a hypodermic needle with the superior volumetric measurement capabilities of a pipetter.

These and other objects of the invention are achieved by an adapter for connecting a pipetter to a hypodermic needle having a holder, the adapter including a conduit having a male end and a female end and a volume; the female end of the conduit being dimensioned to receive an end of the pipetter so that a connection between the female end and the end of the pipetter includes an air-tight friction fit; the male end of the conduit being dimensioned to be inserted into the holder of the hypodermic needle so that a connection between the male end and the holder includes an air-tight friction fit; wherein the volume of the conduit is greater than a volume of a fluid to be transferred.

In a preferred embodiment, the male end of the conduit is tapered.

Another embodiment of the invention is an apparatus for connecting a pipetter to a hypodermic needle, the apparatus including a hypodermic needle held by a holder and an adapter for connecting the pipetter to the holder of the hypodermic needle.

A further embodiment of the invention is an apparatus for transferring a volume of fluid, the apparatus including a pipetter; a hypodermic needle held by a holder; and an adapter for connecting the pipetter to the holder of the hypodermic needle.

The invention also encompasses a method for transferring a volume of liquid from a first object to a second object, the method including the steps of providing a pipetter connected to a hypodermic needle by an adapter, the adapter having a volume greater than the volume of fluid to be transferred; inserting the hypodermic needle into the first object; pipetting the volume of fluid from the first object into the adapter only, so that none of the fluid enters the pipetter; inserting the hypodermic needle into the second object; and discharging the fluid from the adapter.

Further objects, features and advantages of the present invention will become apparent from the following description of the preferred embodiments taken in conjunction with the attached drawing.

BRIEF DESCRIPTION OF THE DRAWINGS

The drawing is hereby expressly made a part of the specification.

DETAILED DESCRIPTION OF THE PREFERRED EMBODIMENTS

The present invention includes an adapter for connecting a conventional pipetter to a conventional hypodermic needle having a holder. By using the inventive adaptor in combination with a pipetter and hypodermic needle, one is able to extract and deliver fluids from objects that require the use of a hypodermic needle, for example, where the object must be pierced by only a small hole. Furthermore, the volume of fluid to be transferred can be very accurately measured by the pipetter. Additionally, because the volume of the adapter is greater than the volume of fluid to be transferred, only the adapter and hypodermic needle are contaminated by the fluid to be transferred. The expense associated with disposable syringes and sterilization is eliminated.

Figure 1:
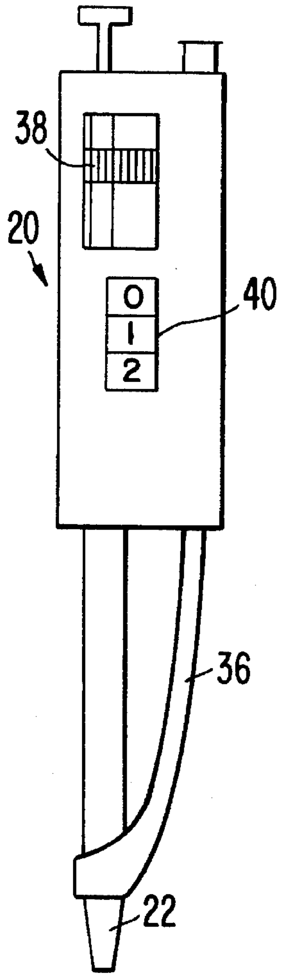
FIG. 1 (PRIOR ART)
FIG. 1 shows a conventional pipetter.

FIG. 1 shows a typical prior art pipetter 20. The inventive adapter may be used with any conventional pipetter. The pipetter 20 shown in FIG. 1 includes a mechanism 36 for ejecting the adapter after use. Rotation of a knob 38 adjusts the volume to be drawn into the adapter. The digital display 40 shows the volume being transferred. The end 22 of the pipetter 20 is conventionally attached to a pipette tip (not shown).

Figure 2:
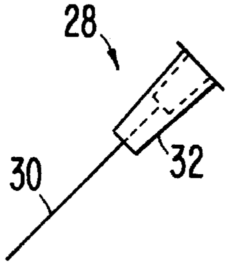
FIG. 2 (PRIOR ART)
FIG. 2 shows a conventional hypodermic needle with holder.

FIG. 2 shows a conventional hypodermic needle 28 comprising a needle portion 30 and a needle holder 32. The needle portion 30 varies in size depending upon the particular application. However, the size of the needle holder 32 is generally the same and is a standardized tapered female opening. Standards for needle holders are detailed in, for example, international standards ISO/R 594: 1967, ISO 594-1: 1986 and ISO 594-2: 1991; which standards are hereby incorporated by reference. The needle holder 32 is most commonly dimensioned with a so-called "Leur" taper.

Figure 3:
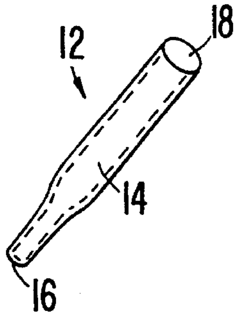
FIG. 3 shows the adapter of the present invention.

FIG. 3 shows the adapter of the present invention. The adapter includes a conduit 14 having a male end 16 and a female end 18. The adapter 12 may be made of a plastic material or any other material which can serve as a conduit for a fluid and is capable of forming friction fits at its ends. In a preferred embodiment, the adapter 12 is made of a sterilizable plastic material.

Figure 4:
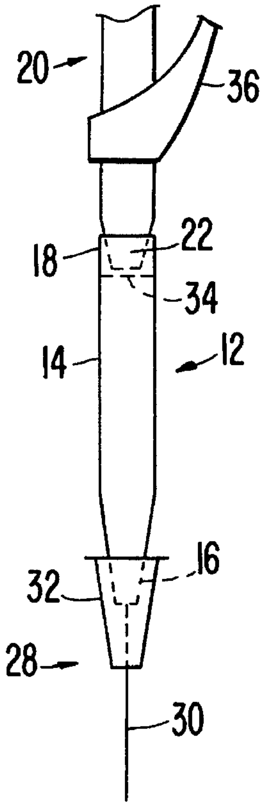
FIG. 4 shows the adapter connected to a pipetter and hypodermic needle.

FIG. 4 shows the adapter 12 connected to the pipetter 20 and the hypodermic needle 28. The male end 16 of the conduit 14 is inserted in the holder 32 of the hypodermic needle 28. The dimensions of the male end 16 are such that the connection between the male end 16 and the holder 32 results in an air-tight friction fit. In a preferred embodiment, the male end 16 is tapered.

The female end 18 of the conduit 14 receives the end 22 of the pipetter 20. The female end 18 is dimensioned so that the connection between the female end 18 and the end 22 of the pipetter results in an air-tight friction fit.

So that none of the fluid to be transferred is drawn into the pipetter 20, the conduit 14 is dimensioned so that the volume of the conduit 14 is greater than the volume of the fluid to be transferred.

The size of the end 22 of the pipetter 20 will vary depending upon the particular pipetter 20 being used. Therefore, the size of the female end 18 of the conduit 14 will also vary depending on the size of the end 22 of the pipetter. It is necessary that the connection between the female end 18 of the conduit 14 and the end 22 of the pipetter 20 form an air-tight friction fit.

Generally, the needle holder 32 is of a standard size. Therefore, the male end 16 of the conduit 14 is generally tapered to the standard size. However, needle holders 32 of different sizes may be used. It is only necessary that the male end 16 of the conduit 14 form an air-tight friction fit with the needle holder 32.

For fitting an exemplary standard size needle holder 32, the dimensions of the male end 16 of the conduit 14 are about 0.30–0.35 inches in length, an inside diameter of about 0.071 inches, and an outside diameter of about 0.155 inches at the tip tapering up at about a 6% rate to about 0.170 inches at about 0.25 inches from the end of the tip. Other sizes of needle holders 32 and male ends 16 are contemplated and within the scope of the invention. It is only necessary that the male end 16 fit with an air-tight friction fit within the needle holder 32.

To help minimize the risk of any contamination of the pipetter 20 by the fluid being transferred, it may be desirable to insert a filter 34 (see FIG. 4) between the end of the pipetter 22 and the adapter 12. Filters 34 are known in the art.

To use the present invention, an adapter 12 is selected which has a volume greater than the volume of fluid to be transferred. The end 22 of the pipetter 20 is inserted into the female end 18 of the adapter 12 to form an air-tight friction fit. The male end 16 of the adapter 12 is inserted into the needle holder 32 to form an air-tight friction fit. The needle portion 30 is then inserted into the first object. The required volume of fluid is then pipetted from the first object into the adapter only, so that none of the fluid being transferred enters the pipetter 20. The needle portion 30 is inserted into the second object. The pipetter 20 is operated to discharge the fluid from the adapter 12.

If a sterile apparatus is then required, the ejecting mechanism 36 of the pipetter is operated to remove the adapter 12 and hypodermic needle 28 from the pipetter. The adapter 12 and hypodermic needle 28 can then be discarded and a sterile adapter 12 and hypodermic needle 28 connected to the pipetter 20 as described above.

The pipetter 20 connected by the adapter 12 to the hypodermic needle 28 is safer than the conventional syringe and needle arrangement because no threading in or out is required to insert or remove the needle. Rather, the ejecting mechanism 36 of the pipetter is operated by pushing a button whereby the adapter 12 with attached hypodermic needle 28 is ejected.

While the invention has been described with reference to certain preferred embodiments, numerous alterations, modifications and changes to the described embodiments are possible without departing from the spirit and scope of the invention as described in the appended claims, and equivalents thereof.

What is claimed is:

1. An adapter for connecting a pipetter to a hypodermic needle having a holder, comprising:

a conduit having a male end and a female end and a volume;

the female end having means for receiving an end of the pipetter so that a connection between the female end and the end of the pipetter includes an air-tight friction fit;

the male end of the conduit having means for inserting into the holder of the hypodermic needle so that a connection between the male end and the holder includes an air-tight friction fit; wherein the volume of the conduit is greater than a volume of a fluid to be transferred.

2. The adapter of claim 1, wherein the conduit is made of a sterilizable plastics.

3. An apparatus for connecting a pipetter to a hypodermic needle, comprising:

a hypodermic needle held by a holder; and an adapter as claimed in claim 1, for connecting the pipetter to the holder of the hypodermic needle.

4. The apparatus of claim 3, wherein the conduit is made of a sterilizable plastic.

5. The apparatus of claim 3, wherein the male end of the conduit is tapered.

6. An apparatus for transferring a volume of fluid, comprising:

a pipetter;

a hypodermic needle held by a holder; and an adapter as claimed in claim 1, for connecting the pipetter to the holder of the hypodermic needle.

7. The apparatus of claim 6, further comprising a filter disposed between the pipetter and the adapter.

8. The apparatus of claim 6, wherein the conduit is made of a sterilizable plastic.

9. The apparatus of claim 6, wherein the male end of the conduit is tapered.

10. A method for transferring a volume of fluid from a first object to a second object, comprising the steps of:

providing a pipetter connected to a hypodermic needle by an adapter as claimed in claim 1, the adapter having a volume greater than the volume of fluid to be transferred;

inserting the hypodermic needle into the first object;

pipetting the volume of fluid from the first object into the adapter only, so that none of the fluid enters the pipetter;

inserting the hypodermic needle into the second object; and discharging the fluid from the adapter.

11. The adapter of claim 1, wherein the male end of the conduit is tapered.

* * * * *